US009146455B2

(12) United States Patent
Ruegg et al.

(10) Patent No.: US 9,146,455 B2
(45) Date of Patent: Sep. 29, 2015

(54) SPATIO-TEMPORAL VIDEO COMPOSITING

(71) Applicant: Disney Enterprises, Inc., Burbank, CA (US)

(72) Inventors: Jan Ruegg, Zurich (CH); Oliver Wang, Zurich (CH); Aljosa Smolic, Aargau (CH); Markus Gross, Zurich (CH)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 0 days.

(21) Appl. No.: 14/022,048

(22) Filed: Sep. 9, 2013

(65) Prior Publication Data
US 2015/0071612 A1 Mar. 12, 2015

(51) Int. Cl.
G03B 27/06 (2006.01)
G11B 27/06 (2006.01)
H04N 5/262 (2006.01)
H04N 5/265 (2006.01)

(52) U.S. Cl.
CPC ............... G03B 27/06 (2013.01); G11B 27/06 (2013.01); H04N 5/262 (2013.01); H04N 5/265 (2013.01)

(58) Field of Classification Search
CPC ....... H04N 5/262; H04N 5/265; H04N 5/272; G03B 27/06

USPC .......................................... 348/239
See application file for complete search history.

(56) References Cited

U.S. PATENT DOCUMENTS

| 7,221,395 | B2 * | 5/2007 | Kinjo | 348/239 |
|---|---|---|---|---|
| 7,750,953 | B2 * | 7/2010 | Furukawa | 348/231.6 |
| 7,787,028 | B2 * | 8/2010 | Kojo | 348/239 |
| 8,279,296 | B2 * | 10/2012 | Kimura et al. | 348/218.1 |
| 8,682,105 | B2 * | 3/2014 | Kawahara | 382/284 |
| 2009/0219300 | A1* | 9/2009 | Peleg et al. | 345/630 |
| 2012/0287309 | A1* | 11/2012 | Awatani | 348/239 |
| 2014/0168475 | A1* | 6/2014 | Corkery et al. | 348/239 |

* cited by examiner

Primary Examiner — James Hannett
(74) Attorney, Agent, or Firm — Patterson + Sheridan, LLP

(57) ABSTRACT

Embodiments provide techniques for creating a composite video stream. Additionally, a first selection of pixels from the first video stream and a second selection of pixels from the second video stream are received. Here, both the first selection of pixels and the second selection of pixels indicate pixels that are to be included in the composite video stream. Embodiments identify a plurality of spatiotemporal seams across the first video stream and the second video stream, based at least in part on the first selection of pixels and the second selection of pixels. The first video stream and the second video stream are then composited into the composite video stream, by joining frames from the first video stream and the second video stream at the identified plurality of spatiotemporal seams.

20 Claims, 10 Drawing Sheets

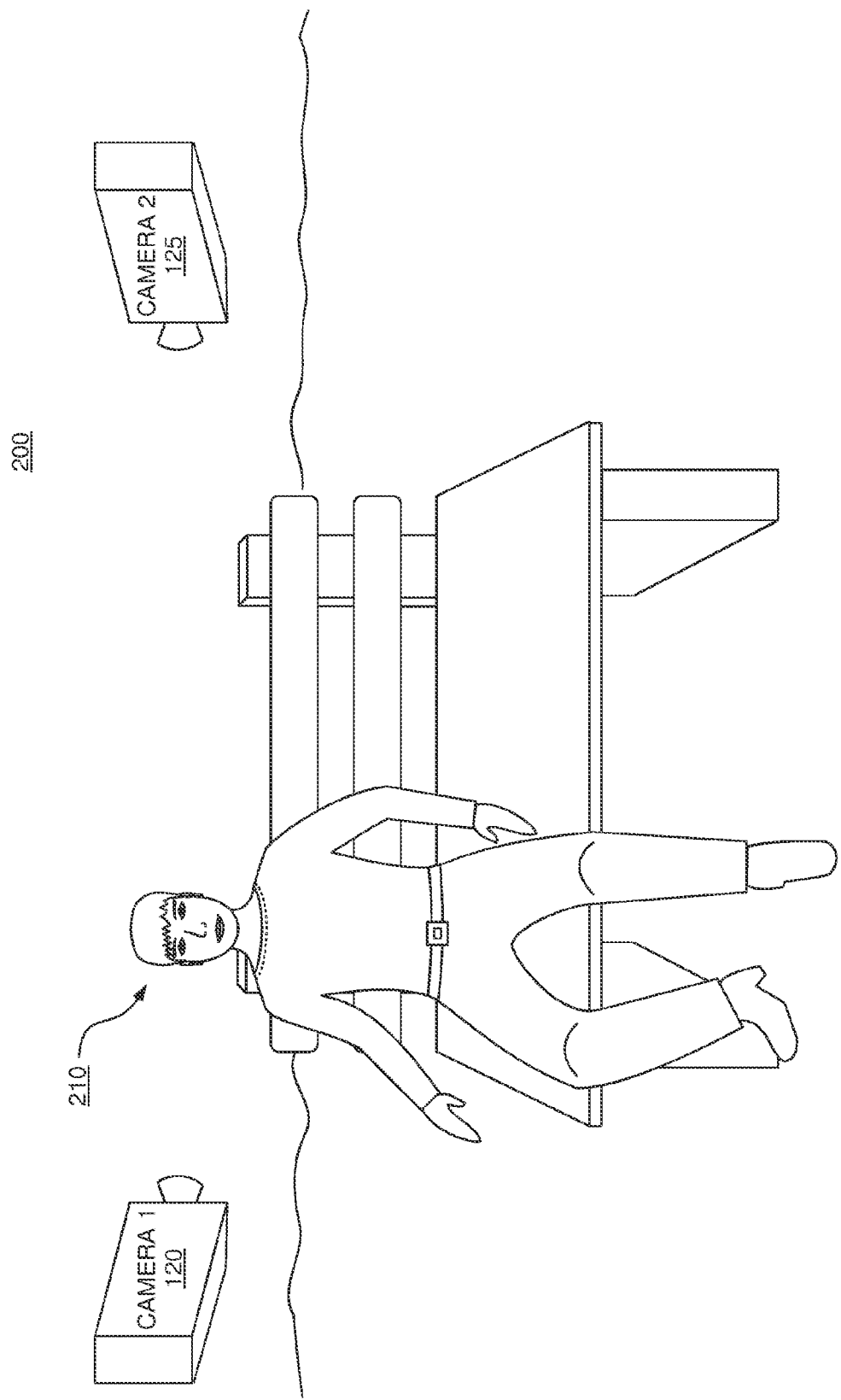

SPATIO-TEMPORAL VIDEO COMPOSITING

FIELD OF THE INVENTION

Embodiments described herein relate to compositing video streams, and more specifically to compositing multiple video streams together based on optimal space-time seams within frames of the video streams.

BACKGROUND

Description of the Related Art

Assembling images composed of multiple photographs is as old as photography itself. Originally achieved through arduous manual cut-and-paste, advanced digital tools now exist that make photo compositing easier (e.g., Poisson blending, alpha matting, graph cuts, etc.). However, video compositing remains a challenging problem, as additional difficulties (e.g., increased computational requirements, temporal stability, alignment, etc.) make video extensions of photographic methods non-trivial. Nonetheless, compositing video is an integral part of modern film making, and virtually all big budget movies contain a number of scenes composed of multiple sources. Uses include special effects shots, realistic background replacement, combining optimal actor performances from multiple takes and removing unwanted scene elements or mistakes.

Video compositing is most commonly accomplished by the digital equivalent of "cut-and paste," rotoscoping, or by chroma keying. While chroma keying is robust and cheap, it cannot be used in all cases as it greatly restricts filming environments and often requires challenging color balancing in post production. On the other hand, rotoscoping is largely a manual process that is both expensive and time consuming, and therefore is most commonly used only for expensive effect shots.

SUMMARY

One embodiment provides a method, system and computer program product for creating a composite video stream. The method, system and computer program product include receiving a first selection of pixels from a first video stream and a second selection of pixels from a second video stream, where both the first selection of pixels and the second selection of pixels indicate pixels to be included in the composite video stream. Additionally, the method, system and computer program product include identifying a plurality of spatiotemporal seams across the first video stream and the second video stream having a minimal visibility impact with respect to both space and time, based at least in part on the first selection of pixels and the second selection of pixels. The method, system and computer program product also include compositing the first video stream and the second video stream to create the composite video stream, by joining frames from the first video stream and the second video stream at the identified plurality of spatiotemporal seams.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 2A-B illustrate physical scenes being filmed by two video capture devices, according to one embodiment described herein.

DETAILED DESCRIPTION

Figure 1:
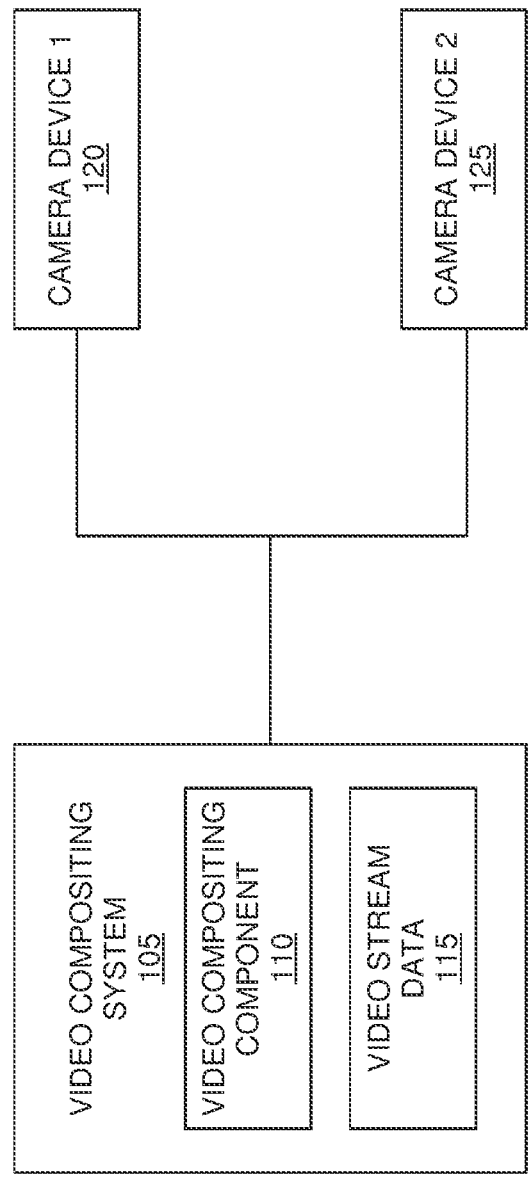
FIG. 1 is a block diagram illustrating a system configured with a video compositing component, according to one embodiment described herein.

Video compositing is largely performed today through the use of rotoscoping or chroma keying. While the chroma keying process is relatively inexpensive, it is also a somewhat limited process that can only be used with certain filming techniques and environments. On the other hand, rotoscoping can be used in many different environments, but is a largely manual process that is both time consuming and expensive.

As such, embodiments provide techniques for compositing video streams that are optimized with respect to both space and time. Embodiments may receive a first video stream and a second video stream to be composited into a single composite video stream. Embodiments may further receive a selection of pixels from each of the video streams that are to be included within the composited video stream. For example, a user could specify that a first person from a first video stream is to be included in the composited video stream, and could further specify that a second object from the second video stream is to be included in the composited video stream. In one embodiment, the user may make such a specification by selecting the pixels using a drawing tool showing a single frame of one of the video streams.

Embodiments may then determine a plurality of spatiotemporal seams across the first video stream and the second video stream, based at least in part on the specified pixels within the video streams. For instance, embodiments may construct a graph, where each node of the graph represents a pixel from a frame of one of the video streams, and where a weight of each edge in the graph is set based on an average difference value of connected nodes. Additionally, the weights of the selected pixels that are necessarily to remain within the composite video stream may be set to a higher value (e.g., infinity), to ensure that these pixels are selected for inclusion in the composite video stream. An iterative graph cut algorithm may then be applied to the constructed graph, in order to determine which pixels from which video stream are to be included within the composite video stream. Such an algorithm is discussed in more detail below in the discussion of FIG. 5. Once the spatiotemporal seams are determined, embodiments may composite the first video stream and the second video stream into the composite video stream, by joining frames from the first video stream and the second video stream at the identified plurality of spatiotemporal seams. Advantageously, doing so provides an efficient and optimized technique for compositing multiple video streams into a single video stream. Of note, certain techniques described herein are also described in Rüegg et al., "DuctTake: Spatiotemporal Video Compositing", which is hereby incorporated by reference in its entirety.

In one embodiment, pixels within one of the video streams being composited are aligned with the corresponding pixels from another one of the video streams, before the spatiotemporal seams are determined. That is, as the spatiotemporal seams indicate which pixels from frames of the video streams should be included in the composite video stream, it is preferable that each pixel from each frame of each video stream correspond to the same point of physical space as the corresponding pixels from the corresponding frames of each of the other video streams. In aligning one of the video streams to another one of the video streams, embodiments may divide frames from each of the video streams into a plurality of blocks, and may calculate a plurality of displacement vectors for each block in the plurality of blocks for the second video stream. Embodiments may then compute a homography that maps the frame from one of the video streams onto the frame from the other video stream, based on the plurality of displacement vectors. Such a technique is discussed in more detail in the discussion of FIG. 8 below.

In some circumstances, due to the way the video streams are aligned, the composited video stream may have empty pixels along the border where no pixel from either video stream existed. As such, embodiments may perform a cropping operation, in which the resolution of the composite video stream is selectively reduced until no empty pixels remain. For instance, embodiments may count a number of empty pixels closest to each border of a first frame of the composite video stream (or, more generally, any video stream). Embodiments may then crop one pixel from the border having the highest number of empty pixels. This process is repeated, until no empty pixels remain within the frame. The next frame of the video stream is then initialized with the current crop, and this iterative process is repeated until all of the frames have been cropped. Such a cropping operation is discussed in more detail below in the discussion of FIG. 7.

Additionally, embodiments may perform a blending operation for pixels within the composite video stream. Generally, the blurring operation is used to hide the spatiotemporal seam(s) at which the two or more video streams were joined by blending the color of pixels along the seam(s). It is contemplated that any number of known and unknown blending techniques may be used to hide these seams, consistent with the functionality described herein. Examples of some such blending techniques include, without limitation, simple alpha-blending techniques, alpha-blending combined with histogram matching techniques, and Poisson blending techniques using convolution pyramids.

In some embodiments, the coloration of the video streams being composited together may differ (e.g., due to differences in camera technology, differences in lighting and viewing angle, etc.). As such, embodiments may perform a color balancing operation on one (or more) of the video streams, such that the coloration of the color balanced video stream(s) match the coloration of another one of the video streams being composited. Advantageously, by normalizing the coloration across all of the video streams being composited, embodiments may produce an improved and more natural looking composite video stream.

FIG. 1 is a block diagram illustrating a system configured with a video compositing component, according to one embodiment described herein. As shown, the system 100 includes a video compositing system 105 coupled to a first camera device 120 and a second camera device 125. The video compositing system 105 includes a video compositing component 110 and video stream data 115. Generally, the video stream data 115 represents the video data received from the video camera devices 120 and 125. For purposes of this example, assume that the video stream data 115 includes a first video stream received from the camera 120 and a second video stream received from the camera 125. Moreover, assume that the video streams capture two different views of the same physical scene.

Figure 2B:
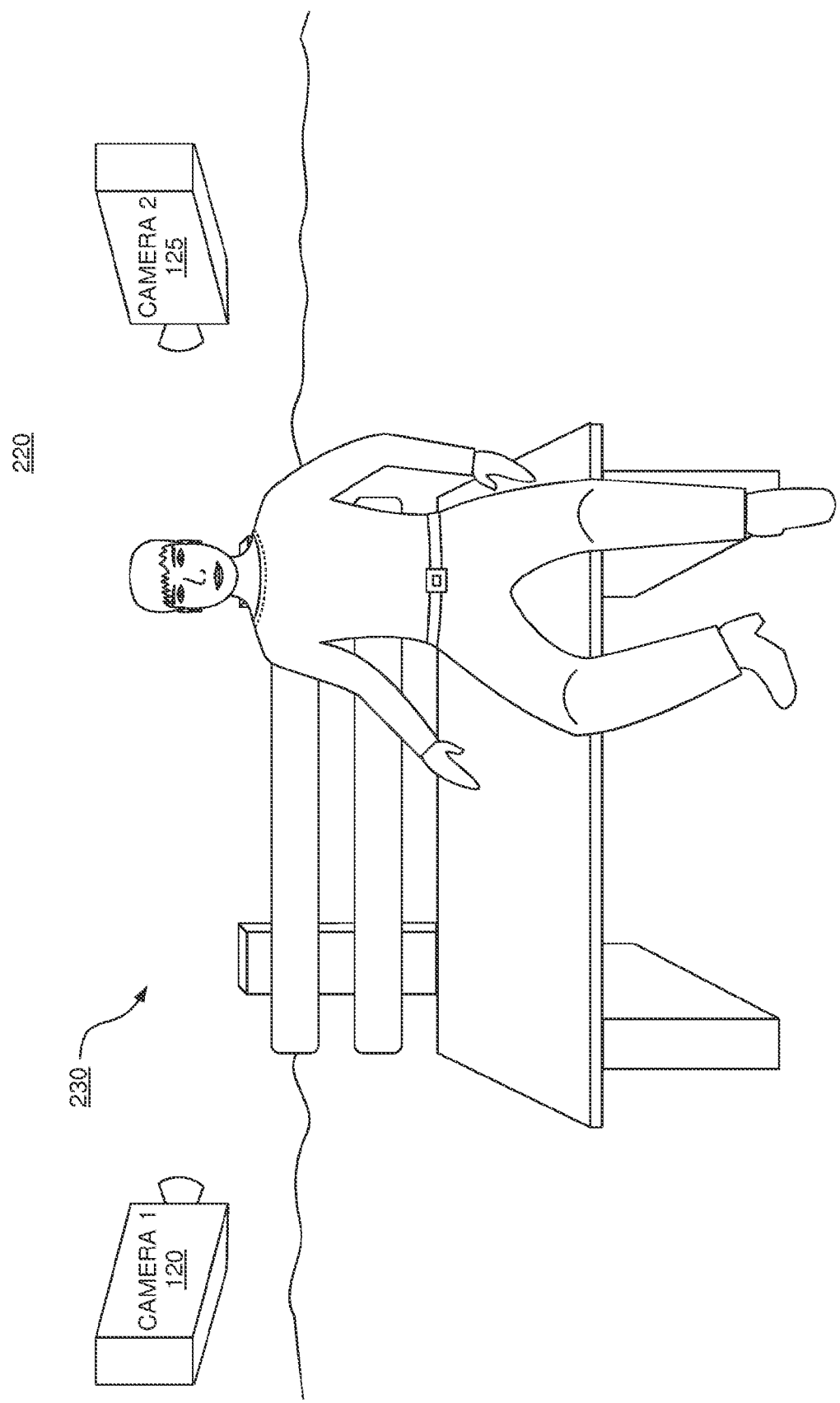

Examples of such scenes are shown in FIGS. 2A-B, which illustrate physical scenes being filmed by two video capture devices, according to one embodiment described herein. As shown in FIG. 2A, the scene 200 includes a person 210 sitting on the left side of a bench, and the cameras 120 and 125 are positioned to capture different views of the scene 200. Of note, while the cameras 120 and 125 are configured to capture video streams based off the same physical scene (e.g., the scene 200), the video streams need not be captured at the same moment in time. Thus, for example, the video camera 120 could capture a first view of the person 210 on the bench, and the video camera 125 could, at a different moment in time, capture a second view of a second person sitting on a different portion of the bench.

Here, assume that the video camera 120 captures a first video stream of the scene 200, in which the person 210 is sitting on the left side of the bench. Continuing the example, FIG. 2B shows a different physical scene 220 in which the person 230 has moved to the right side of the bench. The camera 125 could then capture a second video stream of the scene 220, in which the person 230 is sitting on the left side of the bench.

Figure 3:
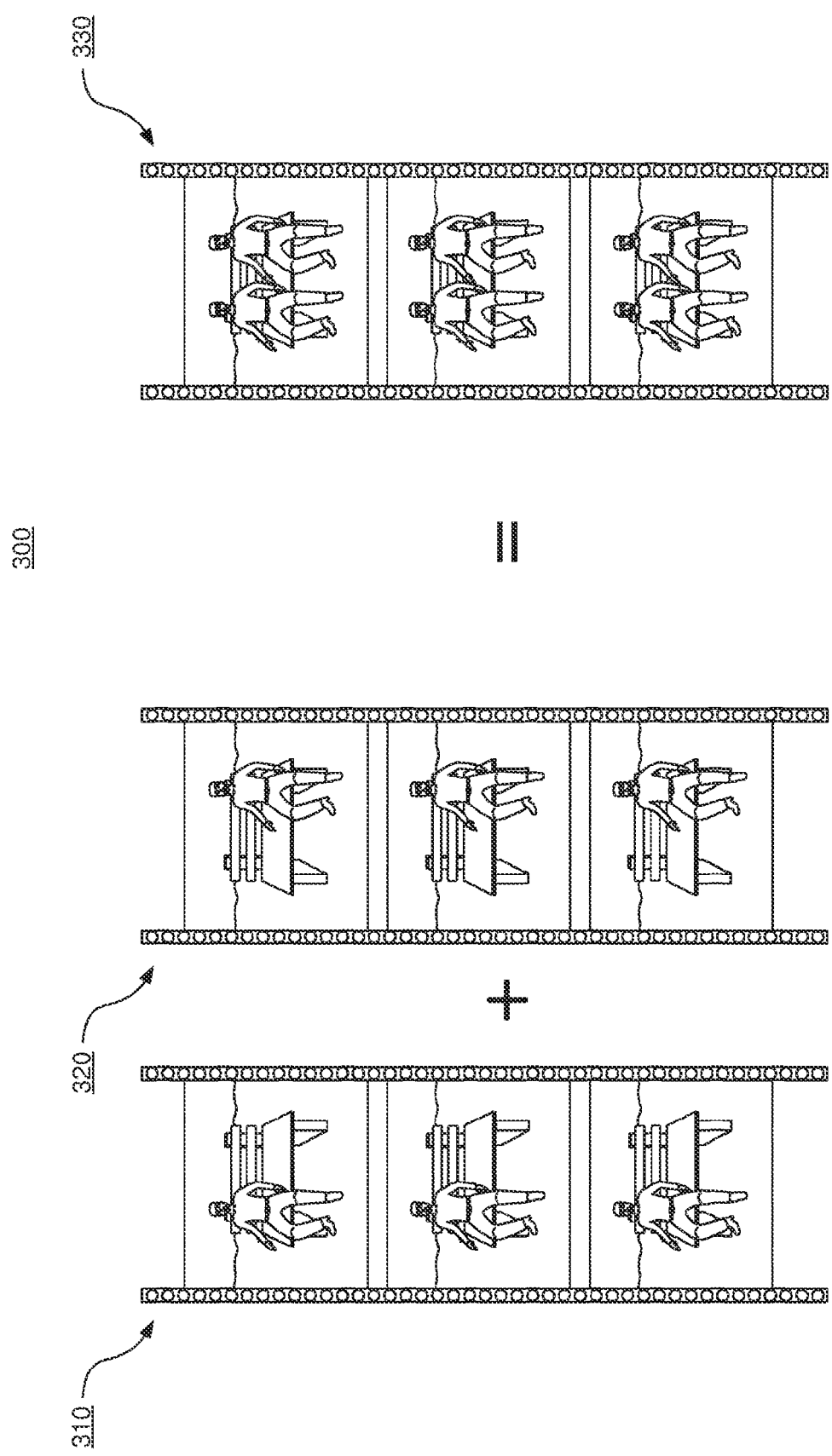
FIG. 3 illustrates a composite video stream formed using the video streams from the video capture devices of FIGS. 2A-B, according to one embodiment described herein.

The video compositing component 110 is generally configured to composite two or more video streams of the same physical scene into a single video stream. Thus, in the present example, the video compositing component 110 could receive a first video stream from the camera 120 and a second video stream from the camera 125, and could composite the two video streams into a single composite video stream. An example of this is shown in FIG. 3, which illustrates a composite video stream formed using the video streams from the video capture devices of FIG. 2, according to one embodiment described herein. Here, the illustration 300 includes a first video stream 310 (i.e., the video stream from the video camera 120) and a second video stream 320 (i.e., the video stream from the video camera 125). Upon receiving the two video streams, the video compositing component 110 has combined the video streams 310 and 320 to create the composite video stream 330. Thus, the video compositing component 110 has combined the first video stream depicting the person 210 on the left side of the bench with the second video stream depicting the person 230 on the right side of the bench, in order to create a composite video stream in which the persons 210 and 230 are seated next to each other on the bench. Of note, the video cameras 120 and 125 in this example may actually represent the same physical video camera, but at different moments in time and potentially different physical positions as well. More generally, it is broadly contemplated that any number of different video streams, from a single camera device or from multiple physical camera devices, may be used consistent with the functionality described herein.

More specifically, the video compositing component 110 could receive a first selection of pixels from the first video stream 310 that should necessarily be included in the composite video stream, and could further receive a second selection of pixels from the second video stream 320 that should also be included in the composite video stream. The video compositing component 110 could then identify a plurality of spatiotemporal seams across the first video stream and the second video stream, based at least in part on the first selection of pixels and the second selection of pixels. Here, the spatiotemporal seams represent which pixels should be taken from each of the video streams 310 and 320 for inclusion in the composite video stream 330, and the spatiotemporal seams are optimized with respect to both space and time. The video compositing component 110 could then composite the first video stream and the second video stream into the composite video stream, by joining frames from the first video stream and the second video stream at the identified plurality of spatiotemporal seams.

Figure 4:
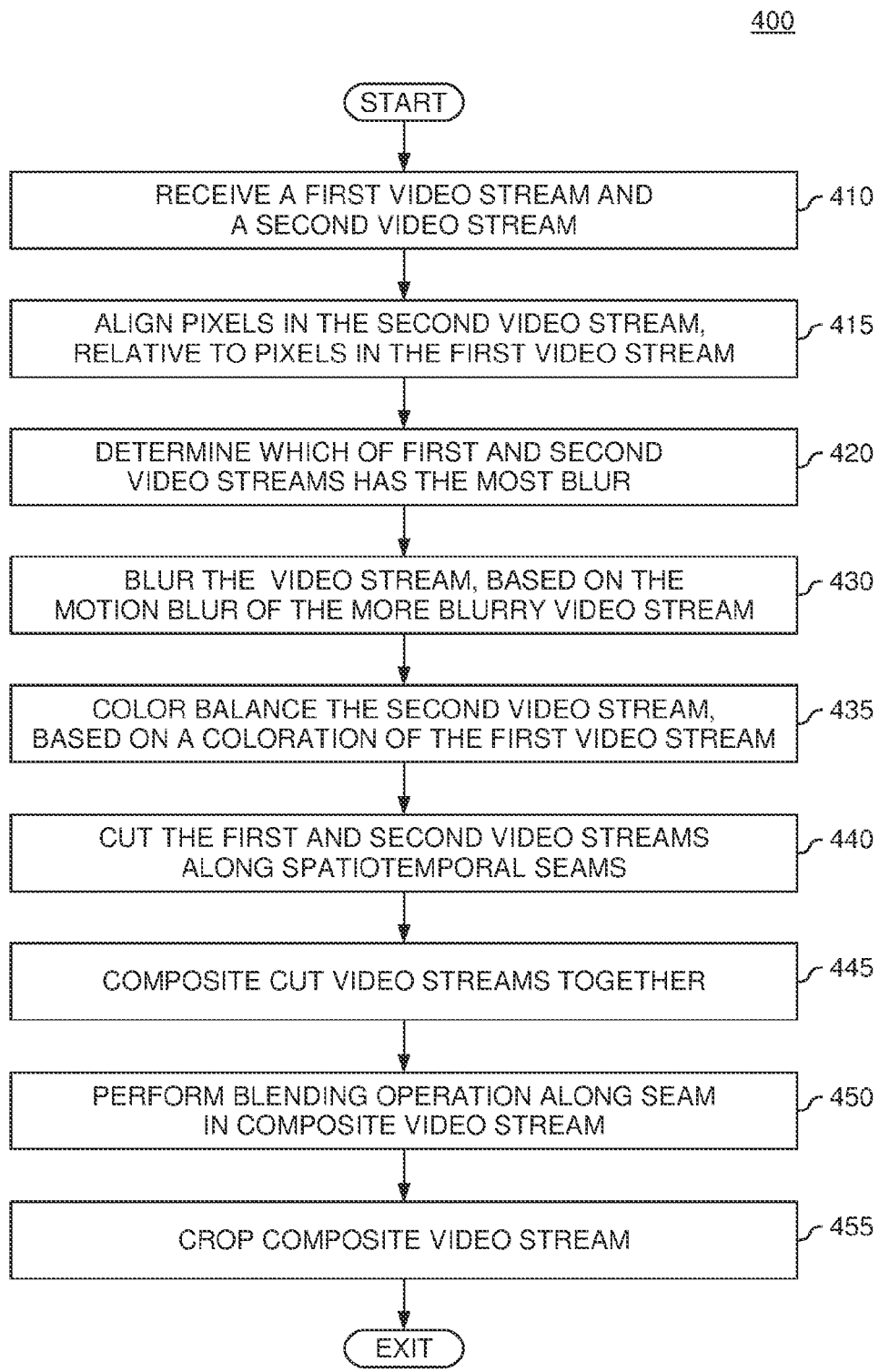
FIG. 4 is a flow diagram illustrating a method for compositing video streams, according to one embodiment described herein.

A technique for compositing the two video streams into a single composite video stream, according to one embodiment, is shown in FIG. 4. As shown, the method 400 begins at block 410, where the video compositing component 110 receives two video streams (e.g., the video streams 310 and 320). Of note, while several examples discussed herein pertain to compositing two video streams into a single video stream, the techniques described herein may also be used to composite more than two video streams into a single video stream. As such, the examples involving only two video streams, such as FIG. 4, are merely for illustrative purposes only and are without limitation.

Upon receiving the video streams, the video compositing component 110 may then begin a process of aligning pixels in frame(s) of one of the video streams relative to pixels in the corresponding frame(s) of the other video stream, while normalizing the amount of blur (e.g., introduced by the camera devices used to film the video streams) within the streams. As shown, the video compositing component 110 aligns pixels in the second video stream, relative to pixels in the first video stream (block 415). In doing this, the video compositing component 110 can normalize the motion (e.g., camera wobble) between the two video streams, which helps to improve the composite video stream. In other words, the video compositing component 110 is configured to align the motion of the two video streams. In one embodiment, the video compositing component 110 computes a homography that maps pixels from a first frame of the second video stream to corresponding pixels in the first frame of the first video stream. The video compositing component 110 may then use the same process for aligning all of the remaining frames of the second video stream. In such an embodiment, however, any errors in the calculated homographies may tend to compound over time, and thus the alignment may suffer for later frames of the video streams.

In a particular embodiment, the video compositing component 110 uses a propagate-and-refine method of calculating the homographies for the frames of the video streams. Here, the video compositing component 110 could perform a hierarchical compass search to map pixels from one frame (e.g., the first frame) of the second video stream onto corresponding pixels in one frame (e.g., the first frame) of the first video stream. The video compositing component 110 could then compute a homography from the multitude of displacement vectors, and use this homography to map the pixels from the frame of the second video stream onto the corresponding frame of the first video stream. For the subsequent frames of the second video stream, the video compositing component 110 could propagate homographies in the temporal direction, and refine such estimates by spatial matching between the two streams. Here, the hierarchical compass search analysis may be less computationally intensive, because the alignment of the predicted frame is closer to the final alignment due. As such, doing so provides both a spatial and temporal alignment of the frames of the first and second video streams. One example of such an alignment process is discussed in more detail below in the discussion of FIG. 8.

Additionally, the video compositing component 110 determines which of the first and second video streams has the most blur (block 420). For instance, in the depicted embodiment, the video compositing component 110 could determine that the second video stream contains less blur than the first video stream (block 415). As an example, the video compositing component 110 could determine that amount of blur in each of the video streams by calculating a sum of absolute values of gradients averaged over color channels. Once the blur is determined for each of the video streams, the video compositing component 110 introduces blur into the second video stream, based on the blur of the first video stream (block 430). Thus, in effect, the video compositing component 110 normalizes the blur between the first video stream and the second video stream in the depicted embodiment, by introducing the blur of the more blurry video stream (i.e., the first video stream in this example) into the less blurry video stream (i.e., the second video stream in this example). Advantageously, doing so helps to normalize the blur between the video streams, without having to perform blur removal techniques which can be difficult and even infeasible in some situations.

In the depicted embodiment, the video compositing component 110 also performs a color balancing operation to the second video stream, so as to normalize the second video stream's coloration relative to the coloration of the first video stream (block 435). Here, because the video streams are being composited together, it is ideal for the same point of physical space represented in each of the videos to have the same coloration within each of the videos. Thus, a single point of the park bench in the scene 200 should be represented using the same color in both of the video streams (e.g., a particular shade of brown). Advantageously, doing so helps to ensure that the composited video stream has uniform coloration. Of note, while only the coloration of one of the video streams (i.e., the second video stream) is adjusted in this example, other embodiments may adjust the coloration of other video streams (or all of the video streams being composited), consistent with the functionality described herein.

Once the coloration of the second video stream is adjusted, the video compositing component 110 determines spatiotemporal seams along which to cut the first and second video streams (block 440). Here, the video compositing component 110 could compute a seam penalty equal to a sum of the squared distance between the colors of the first and second video (A, B) at each pixel it separates. The video compositing component 110 could then use such a seam penalty to determine a seam that separates the user selections of pixels (i.e., the pixels from each of the first video and the second video streams that a user has indicated should remain within the composite video stream) while having a minimum visibility penalty. For example, the video compositing component 110 could compute a labeling that minimizes a determined visibility penalty. An example of such a visibility penalty is discussed in more detail below in the discussion of FIG. 5.

The video compositing component 110 then composites the video streams together using the determined spatiotemporal seams (block 445). For instance, the spatiotemporal seams may be represented by data specifying, for each pixel of each frame of the composite video stream, which of the first and second video streams the respective pixel is taken from. Additionally, in the depicted embodiment, the video compositing component 110 performs a blending operation along the spatiotemporal seams in the composite video stream (block 450). Such a blending operation may help to offset, for instance, any imperfections in the coloration adjustment performed in block 435, and in general helps to hide the seams along which the first and second video streams were joined. Generally, any type of blending operation capable of performing this function may be used, with examples including, without limitation, simple alpha-blending techniques, alpha-blending combined with histogram matching techniques, and Poisson blending techniques using convolution pyramids.

The video compositing component 110 then crops the composite video stream (block 455), and the method 400 ends. Here, due to the way in which pixels from the second video stream are aligned with pixels from the first video stream, it is possible that areas within the composite video stream exist where no pixel exists in the first and second video streams. That is, as frames from the second video stream are in effect warped to align with the corresponding frames of the first video stream using the determined homography, there may be some areas along the borders of the frames in which, due to the warping operation, no pixels exist. As such, for these empty pixels, the video compositing component 110 may be unable to determine which of the first and second video streams the pixel is to be taken from. However, as these empty pixels occur (if at all) around the edges of the frames in the composite video stream, the video compositing component 110 may down sample the composite video stream to a lower resolution by cropping these empty pixels out of the frames. One such cropping algorithm is discussed in more detail below in the discussion of FIG. 7.

Figure 5:
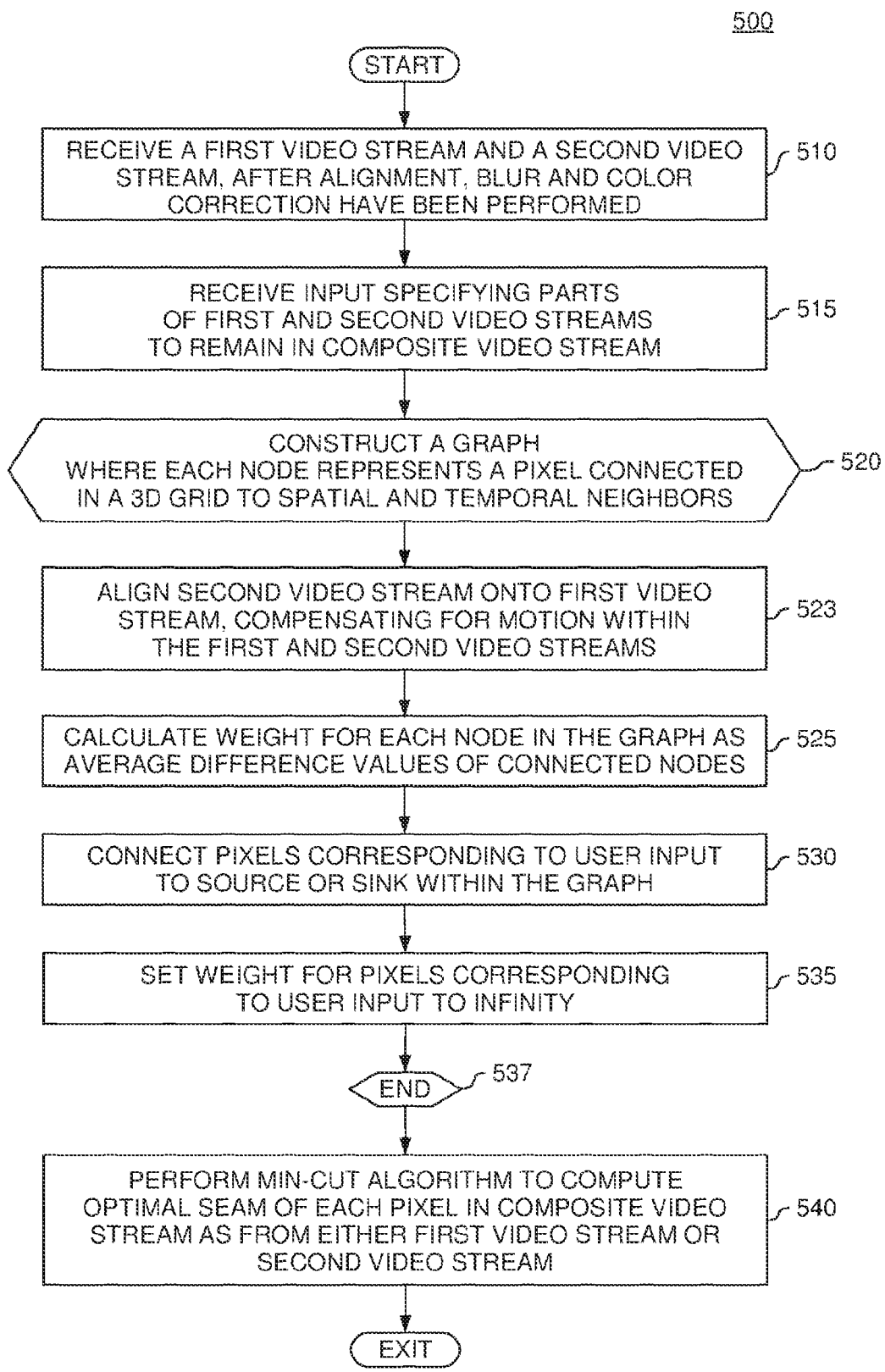
FIG. 5 is a flow diagram illustrating a method for determining spatiotemporal seams for use in compositing video streams, according to one embodiment described herein.

FIG. 5 is a flow diagram illustrating a method for determining spatiotemporal seams for use in compositing video streams, according to one embodiment described herein. As shown, the method 500 begins at block 510, where the video compositing component 110 receives a first video stream and a second video stream to be composited. Additionally, the video compositing component 110 receives input (e.g., from a user) specifying pixels within each of the first and second video streams that should be included within the composited video stream (block 515). The video compositing component 110 then constructs a three-dimensional (3D) graph, where each node of the graph represents a pixel from one of the first and second video streams, and where each node is connected in a 3D grid to the nodes corresponding to the pixel's spatial and temporal neighbors (block 520).

Figure 8:
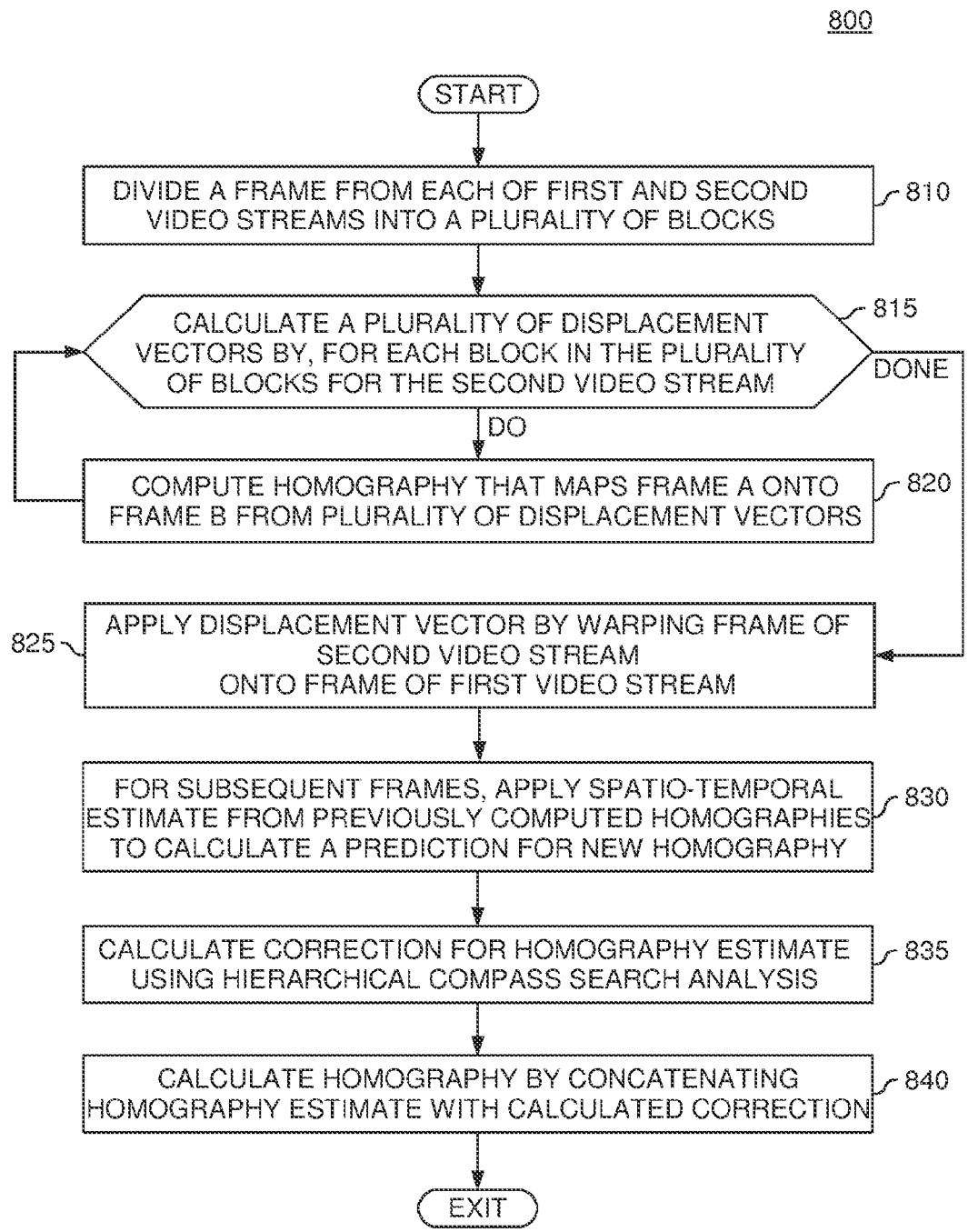
FIG. 8 is a flow diagram illustrating a method for aligning video streams using a hierarchical compass search and propagate-and-refine techniques, according to one embodiment described herein.

For that, the video compositing component 110 aligns frames within the second video stream to corresponding frames of the first stream, while compensating for motion within the first and second video streams (block 523). For example, the video compositing component 110 could compute a mapping of a frame (e.g., the first frame) of the second video stream onto a corresponding frame (e.g., the first frame) of the first video stream, and the video compositing component 110 could then use a propagate-and-refine technique for aligning the subsequent frames of the first and second video streams. One example of such an alignment is shown in FIG. 8 and is discussed in more detail below.

From the aligned frames, the video compositing component 110 could then compute a motion compensated video cube using the estimated homographies, where each frame is transformed by the homography mapping it to the previous frame. This allows the video compositing component 110 to build a compensated graph, where every node in a current frame t is connected to a node in a following frame t+1 that corresponds to the node nearest to the homography transformation of that point. Doing so provides motion-compensated seams, which may be much more accurate in case of sequences with camera motion.

Additionally, the video compositing component 110 calculates a weight for each edge of the graph, where the weight is calculated as an average difference value of nodes connected by the edge (block 525). That is, the calculated weights may be the difference of the pixel values, as each node in the graph represents a respective pixel. Additionally, the pixels specified in the received input from block 515 are connected to a source or a sink within the graph (block 530), and the weights associated with the pixels specified in the received input are set to infinity (block 535). That is, as these pixels are to remain within the composite video stream, their corresponding weights are set to the highest possible value, to ensure their inclusion in the composite video stream.

The video compositing component 110 then performs a standard min-cut algorithm to compute an optimal labeling of each of the pixels in the composite video stream, as coming from either the first video stream or the second video stream (block 540), and the method 500 ends. Here, the video compositing component 110 may compute a difference map that specifies a coloration difference between pixels within each frame of the second video stream and the corresponding frames of the first video stream. The video compositing component 110 could then compute a seam penalty equal to the sum of the squared distance between the colors of the first and second video at each pixel a given seam separates, with the goal being to find a seam that separates strokes with the minimum visibility penalty.

For example, the video compositing component 110 could compute a labeling that minimizes the following penalty shown in Equation 1, for all pixels i, where $D(i) = \|A_i - B_i\|^2$ if A and B overlap, 0 otherwise.

Visibility Penalty $$E = \sum_i \left( \sum_{j \in N_s(i)} \delta(i, j) D(i) + \sum_{k \in N_t(i)} \lambda \delta(i, k) D(i) \right) \quad \text{Equation 1}$$

Here, $N_s(i)$ are the 4 spatial and $N_t(i)$ are the 2 temporal neighbors of I, and $\delta(i,j)$ is 1 if i,j are assigned different labels by the seam, else 0. The penalty for cutting temporal neighbors has different significance to cutting spatial neighbors, and is controlled by $\lambda A$. A high $\lambda$ penalizes the seam cutting through a bad location at each frame. In one embodiment, the $\lambda$ is set to a default value of 1. However, the penalty (i.e., the value of $\lambda$) can be tailored to best fit the particular video streams being composited.

In this embodiment, to minimize E, the video compositing component 110 may construct a graph where each node represents a pixel connected in a 3D-grid to spatial and temporal neighbors. Here, the weights of the edges in the graph correspond to the average difference values of connected nodes.

Additionally, all pixels that the user has specified should necessarily be included in the composite video stream are connected to the source or sink respectively, and their weights set to infinity. The video compositing component 110 may then run a standard min-cut algorithm to compute the optimal labeling. Such a standard min-cut algorithm is described by Boykov et al., "An experimental comparison of min-cut/max-flow algorithms for energy minimization in vision," In *Energy minimization methods in computer vision and pattern recognition* (2001), Springer, pp. 359-374, which is hereby incorporated by reference in its entirety.

Figure 6:
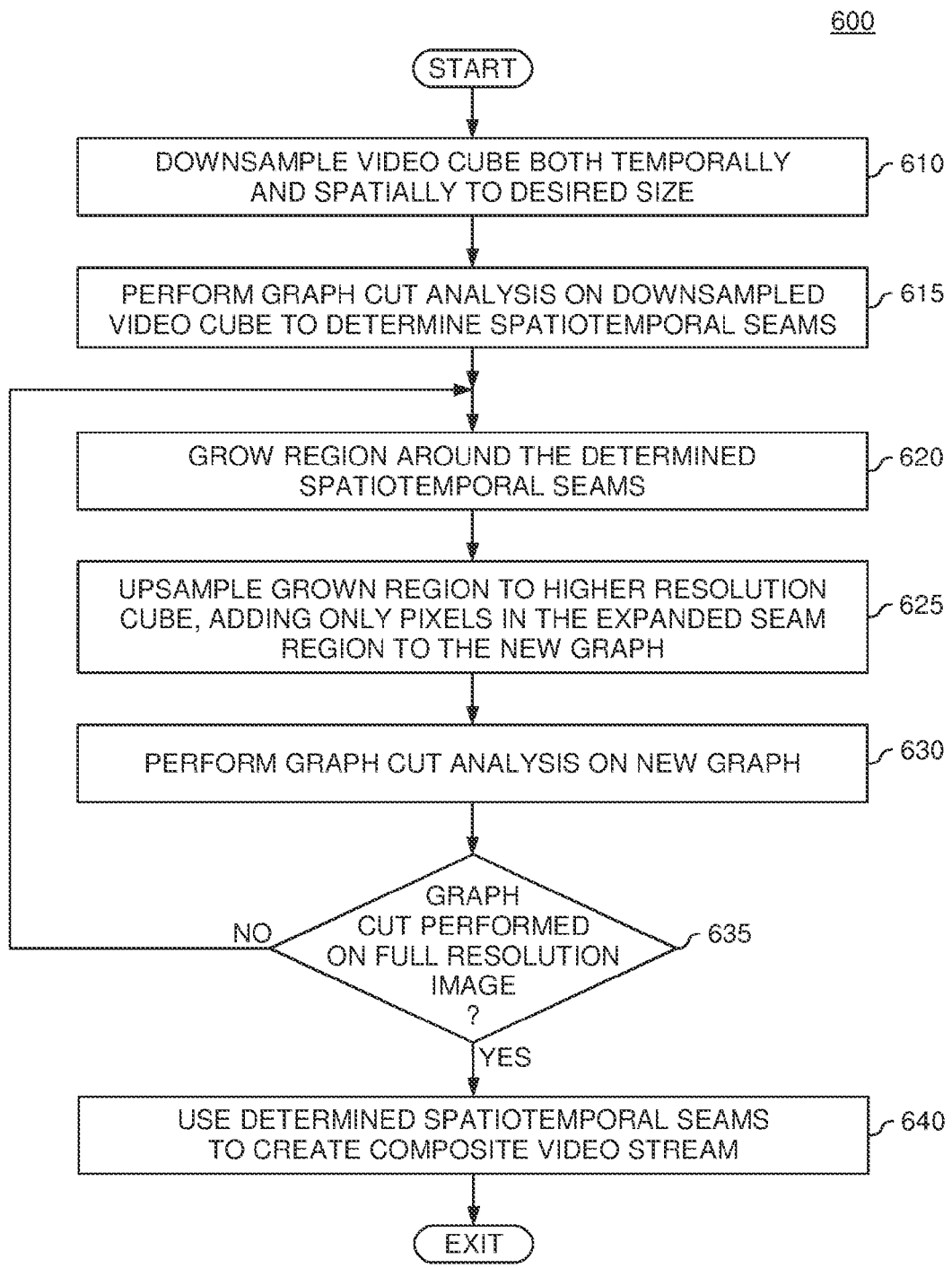
FIG. 6 is a flow diagram illustrating a method for determining spatiotemporal seams using a coarse-to-fine approach for use in compositing video streams, according to one embodiment described herein.

In some situations, performing the aforementioned graph cut analysis on a high definition video cube is not computationally feasible (i.e., such a process may consume a substantial amount of time and processing resources). As such, in one embodiment, the video compositing component 110 is configured to reduce the size of the graphs using a coarse-to-fine refinement approach. An example of this is shown in FIG. 6, which is a flow diagram illustrating a method for determining spatiotemporal seams for use in compositing video streams, according to one embodiment described herein. As shown, the method 600 begins at block 610, where the video compositing component 110 downsamples the video cube (i.e., the graph) both temporally and spatially to a desired size. Generally, the size the video cube is downsampled to can be configured based the processing resources available.

The video compositing component 110 then performs the graph cut analysis on the downsampled video cube to determine the plurality of spatiotemporal seams (block 615). Here, by performing the graph cut analysis on the downsampled graph, as opposed to a high definition video cube), the video compositing component 110 is able to perform the graph cut analysis more quickly, as the graph cut analysis is less computationally intensive. However, the results of the graph cut analysis performed on the downsampled graph may not be as precise as the graph cut analysis performed on the high definition graph. As such, the video compositing component 110 then grows the region around the spatiotemporal seams (block 620) and upsamples the grown region to a higher resolution cube, adding only pixels in the expanded seam region to the new graph (block 625). The video compositing component 110 then performs the graph cut analysis on the new graph to recalculate the spatiotemporal seams (block 630). By doing this, the video compositing component 110 is able to refine the graph cut analysis at a higher resolution, while focusing the graph cut analysis only on the region around the determined spatiotemporal seam (i.e., as opposed to the entire graph of the high definition video).

Once the graph cut analysis has been performed, the video compositing component 110 determines whether the resolution of the upsampled region was equal to the full resolution of the video streams (block 635). If not, the method returns to block 620, where the video compositing component 110 again grows the region around the determined spatiotemporal seams. If the video compositing component 110 has upsampled the graph to the full resolution of the video stream, the video compositing component 110 uses the determined spatiotemporal seams to composite the video streams into the composite video stream (block 640), and the method 600 ends.

Figure 7:
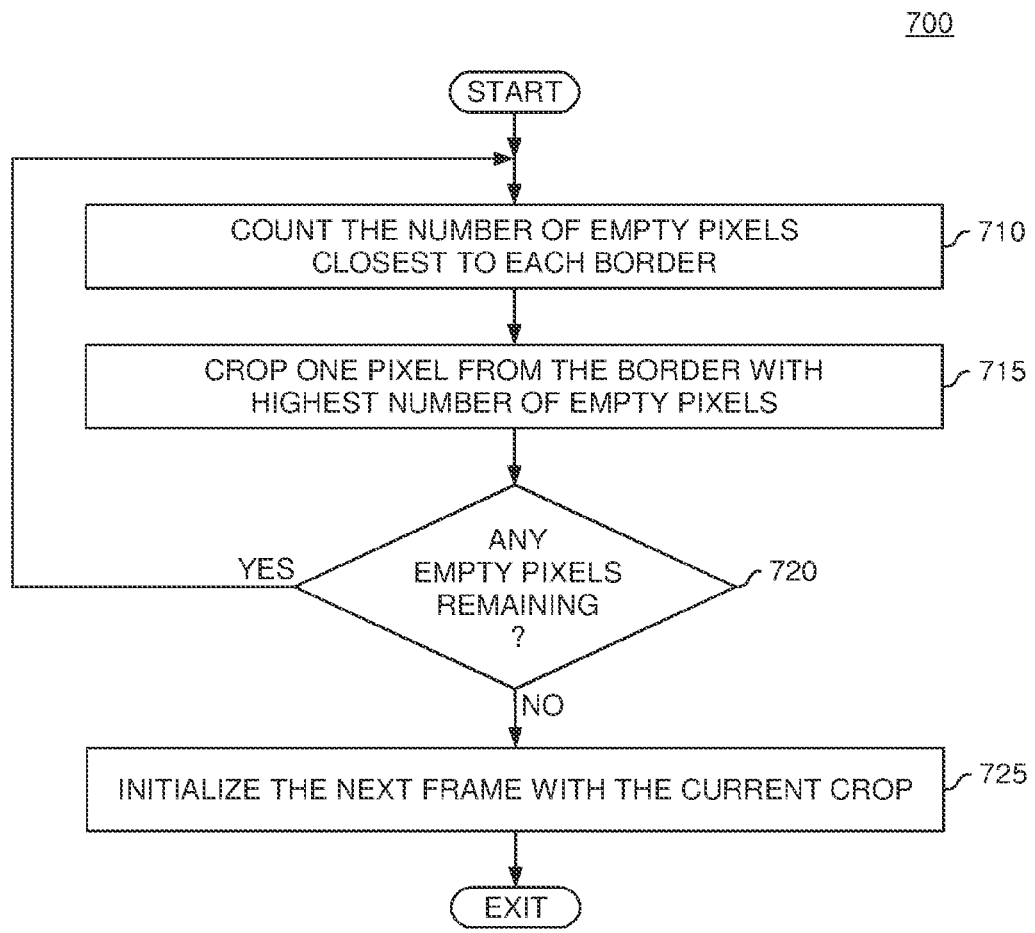
FIG. 7 is a flow diagram illustrating a method for cropping a video stream, according to one embodiment described herein.

As discussed above, in some circumstances the video compositing component 110 may crop the composited video, to eliminate any empty pixels resulting from the video stream(s) being warped during the alignment process. One example of this is shown in FIG. 7, which is a flow diagram illustrating a method for cropping a video stream, according to one embodiment described herein. As shown, the method 700 begins at block 710, where the video compositing component 110 counts, for each of the four borders of the first frame of the composite video stream, a number of empty pixels closest to the respective border. The video compositing component 110 then crops one row or column of pixels from the border having the highest number of empty pixels (block 715). The video compositing component 110 then determines whether any empty pixels remain within the first frame (block 720). If so, the method 700 returns to step 710, where the video compositing component 110 again counts a number of empty pixels for each border of the image, and repeats the copping process at block 715. On the other hand, if no empty pixels remain, the video compositing component 110 then begins the cropping operation for the next frame of the composite video stream, while initializing the cropping operation with the current crop for the first frame (block 725), and the method 700 ends. Here, the video compositing component 110 can continue processing each subsequent frame of the composite video stream using the cropping operation shown in the method 700, initializing each subsequent frame with the determined crop from the previous frame. Advantageously, doing so provides a fast and efficient cropping operation for the composite video stream, Additionally, as discussed above, as part of compositing the video streams together, the video compositing component 110 may map pixels from one of the video streams onto the corresponding pixels from another one of the video streams. That is, the results of seam-based compositing may improve when the video streams are well aligned. In addition, it may be preferable to equalize camera motion across of the video streams being composited, as otherwise visible wobbling and "swimming" artifacts may appear where the content has different motion.

As such, embodiments provide an efficient and robust video alignment technique, which generally includes matching (e.g., computing correspondences between video streams) and warping (e.g., where one video stream is warped to the view of the other video stream). An example of such a technique is shown in FIG. 8, which is a flow diagram illustrating a method for aligning video streams. Of note, while FIG. 8 illustrates one exemplary technique for aligning video streams, it is broadly contemplated that embodiments described herein may use any alignment technique that is consistent with the functionality described herein. Moreover, it is contemplated that the alignment technique described in FIG. 8 may be used outside of the video compositing context, and more generally can be used for aligning any two or more video streams regardless of the context.

As shown, the method 800 begins at block 810, where the video compositing component 110 divides some frames (e.g., the first frames) of the first and second video streams into a plurality of blocks. Here, each of the blocks comprises a plurality of pixels, and each of the blocks may generally be equal in size. The video compositing component 110 then calculates a plurality of displacement vectors for the frames where, for each block in the plurality of blocks of the second video stream (block 815), the video compositing component 110 computes a homography that maps the frame from the second video stream onto the frame of the first video stream, based on the plurality of displacement vectors (block 820). For instance, the video compositing component 110 could perform a hierarchical compass search to find horizontal and vertical offset values that shift the corresponding block from the second video stream to match a corresponding block in the first block stream. In other words, a displacement vector specifies how the blocks of pixels within the second video stream should be shifted in order to align with the blocks of pixels from the first video stream. For instance, the video compositing component 110 could employ a compass search algorithm to determine the displacement vectors. Generally, a compass search may find a single horizontal and vertical offset dx, dy that shifts a block in image B to match a block in image A. An example of this is shown in Equation 2.

Compass Search $$\underset{dx,dy}{\mathrm{argmin}} \frac{\sum_{x,y} \Psi(A(x, y), B(x+dx, y+dy))}{\sum_{x,y} 1} \qquad \text{Equation 2}$$

Here, $\psi$ is a distance function, such as L1 or L2 norms, or a combination gradient and color different in different color spaces (RGB and LAB). In one embodiment, the video compositing component 110 is configured to use RGP L1 norm, to balance quality and processing speed concerns. Additionally, rather than checking all possible dx, dy permutations (i.e., an exhaustive search), the video compositing component 110 may be configured to use an iterative approach. For instance, given a particular dx, dy pair, the video compositing component 110 could test 9 possible neighbor shifts (i.e., dx±1, dy±1), and the video compositing component 110 could then select the neighbor shift having the minimum difference. The video compositing component 110 could then perform a sub-pixel refinement by fitting a parabola through the difference at dx and its two neighbors and computing the extrema.

Moreover, the video compositing component 110 may be configured to find dx, dy using a coarse-to-fine refinement scheme. For instance, the video compositing component 110 could downsample both frames in a pyramid and start the single pixel search on the lowest level, where the pyramid height is determined by the largest expected displacement. After one step, the video compositing component 110 could double dx, dy and could use this as a starting point for the next higher resolution level. In one embodiment, the video compositing component 110 is configured to use a hierarchical compass search to determine the homography. For instance, the video compositing component 110 could divide every block into a number of smaller blocks at every resolution level in the coarse-to-fine refinement scheme. The video compositing component 110 may then independently perform the matching analysis on each of these smaller blocks. In such an embodiment, the video compositing component 110 could define a smooth parameter, a level parameter and a division parameter, where the level parameter controls the number of coarse-to-fine levels, the division parameter controls the number of sub-blocks that each block gets divided into at the next level, which determines the final resolution of the matches, and the smooth parameter controls the size of the overlap region in blocks (e.g., smooth=1 means an overlap of one block). Moreover, the video compositing component 110 could use such hierarchical compass matching to compute both an initial spatial view-to-view matching as well as a per-video temporal frame-to-frame matching (e.g., using the parameters level=5, division=5 and smooth=0).

The video compositing component 110 then uses the determined plurality of displacement vectors to estimate a homography for warping the selected frame of the second video stream onto the corresponding frame of the first video stream (block 825). From the plurality of translation offsets dx, dy (a vector field), the video compositing component 110 may also estimate other warping effects (e.g., rotation, perspective change, skew, stretch, global translation, etc.). Of note, while such global warping produces an accurate match between the two video streams being composited, such warping effects may also result in empty pixels within the composite video stream. As such, the video compositing component 110 may employ a cropping algorithm to remove such empty pixels from the composite video stream. For example, the video compositing component 110 could use the cropping algorithm shown in 7 and discussed above.

While the video compositing component 110 could be configured to perform an independent hierarchical compass search for each frame of the video streams, this may not produce a temporally stable composite video stream. Moreover, simply smoothing such a composite video stream may be insufficient, as the video compositing component 110 may be unable to determine whether the wobbling in the composite video stream is due to incorrect estimate or camera shake in one of the video streams. As such, the video compositing component 110 may be configured to use a propagate-and-refine technique. Here, the video compositing component 110 could, for each of the subsequent frames (in either temporal direction) of the video streams, apply a spatiotemporal estimate from previously computed homographies to calculate a prediction for a new homography to be calculated (block 830). Doing so helps to ensure the composite video stream is temporally stable.

For instance, the video compositing component 110 could calculate frame-to-frame homographies for both video streams independently. Such frame-to-frame homographies could be calculated for the entirety of the video streams. Additionally, the video compositing component 110 could calculate such homographies using the process explained above, where for temporally adjacent frames, the video compositing component 110 computes a plurality of displacement vectors using a hierarchical compass search, and derives the homography from the vector field. Doing so characterizes each in-stream camera motion independently, although the camera motions are yet not aligned to each other and stabilized. Having previously computed the spatial mapping between the two video streams (i.e., the alignment) for time t available as $H_t$, as well as temporal homographies for the corresponding frames $H_a$ and $H_b$, the video compositing component 110 could calculate a prediction for a following homography $H^*_{t+1}$ for time t+1 as defined in Equation 3 (block 835).

$$H^*_{t+1} = H^{-1}_a * H_t * H_b$$

Equation 3—Temporally Propagated Homography Prediction

This temporally propagated homography prediction is with a very high probability already very close to the actual spatial homography at time t+1 denoted as $H_{t+1}$. Such a use of spatial and temporal homographies for prediction may be visualized as shown in Equation 4.

Equation 4 - Temporal and Spatial Homography Prediction

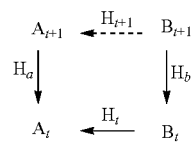

Here, $A_t$ and $B_t$ correspond to the images (i.e., frames) from the first and second video streams at time t, for which a spatial homography is already available. Then, as $H^*_{t+1}$ is already a close estimate of $H_{t+1}$, the video compositing component 110 need only calculate a small correction $\Delta H_{t+1}$. For that, the actual frame $B_{t+1}$ is warped using the predicted homography $H^*_{t+1}$, resulting in a warped image $B^*_{t+1}$, which is already very similar to $A_{t+1}$. The video compositing component 110 may compute the correction $\Delta H_{t+1}$ using the same process as described before (i.e., computing a plurality of displacement vectors by hierarchical compass search, and deriving the homography from the vector field), but now using $A_{t+1}$ and $B^*_{t+1}$ as inputs. Finally, the video compositing component 110 may compute the spatial homography for time t+1 by concatenation as defined in Equation 5 (block 840), and the method 800 ends.

$$H_{t+1} = \Delta H_{t+1} * H^*_{t+1}$$

Equation 5—Final Spatial Homography

The video compositing component 110 could then repeat this process recursively for all times, resulting in accurate and robust alignment of both video sequences.

Figure 9:
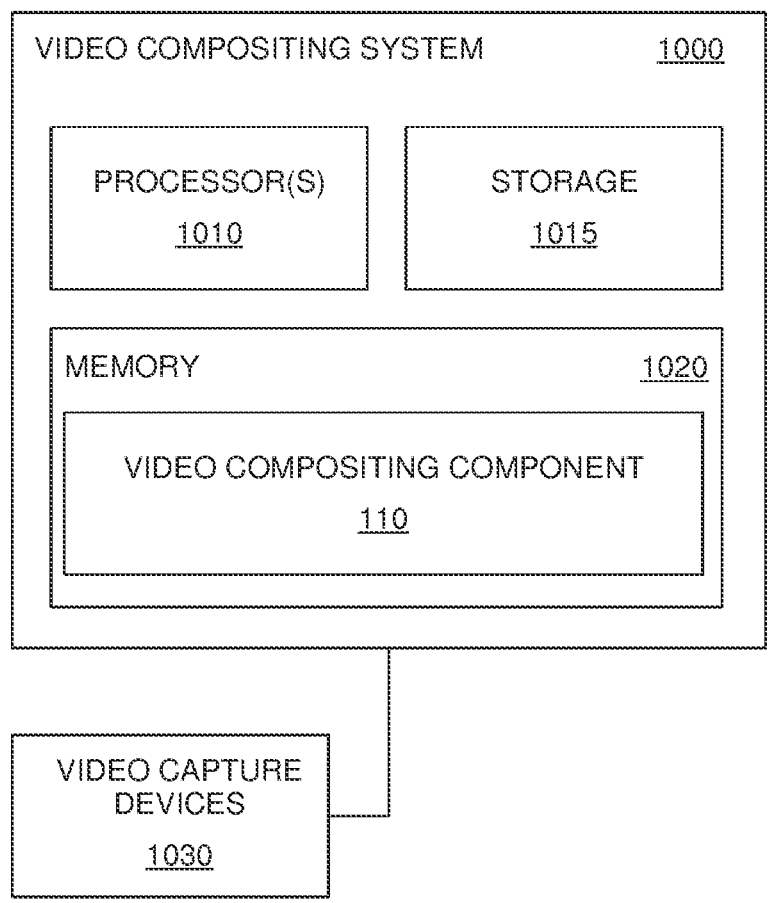
FIG. 9 is a block diagram illustrating a system configured with a video compositing component, according to one embodiment described herein.

FIG. 9 is a block diagram illustrating a system configured with a video compositing component, according to one embodiment described herein. In this example, the video compositing system 1000 includes, without limitation, a processor 1010, storage 1015, memory 1020, an image capture device(s) 1030, and a display device(s) 1035. Generally, the processor 1010 retrieves and executes programming instructions stored in the memory 1020. Processor 1010 is included to be representative of a single CPU, multiple CPUs, a single CPU having multiple processing cores, GPUs having multiple execution paths, and the like. The memory 1020 is generally included to be representative of a random access memory. The system 1000 may also include a network interface(s) which enables the system 1000 to connect to a data communications network (e.g., wired Ethernet connection or an 802.11 wireless network). Further, while the depicted embodiment illustrates the components of a particular system 1000, one of ordinary skill in the art will recognize that such systems may use a variety of different hardware architectures. Moreover, it is explicitly contemplated that embodiments of the invention may be implemented using any device or computer system capable of performing the functions described herein.

The memory 1020 represents any memory sufficiently large to hold the necessary programs and data structures. Memory 1020 could be one or a combination of memory devices, including Random Access Memory, nonvolatile or backup memory (e.g., programmable or Flash memories, read-only memories, etc.). In addition, memory 1020 and storage 1015 may be considered to include memory physically located elsewhere; for example, on another computer communicatively coupled to the system 1000. Illustratively, the memory 1020 includes a video compositing component 110. Such a memory 1020 may also include an operating system (not shown), which generally controls the execution of application programs on the system 1000. Examples of operating system may include UNIX, a version of the Microsoft Windows® operating system, and distributions of the Linux® operating system.

As discussed above, the video compositing component 110 is generally configured to composite two or more video streams into a single video stream, where the two or more video streams are captured in the same physical environment. For instance, the video compositing component 110 may receive a first video stream and a second video stream to be composited together. As discussed above, the video compositing component 110 is not limited to compositing only two video streams together, and more generally the video compositing component 110 may be configured to composite two or more video streams into a single video stream. The video compositing component 110 then identifies a plurality of spatiotemporal seams across the first video stream and the second video stream.

The video compositing component 110 then composites the first video stream and the second video stream into a composite video stream, by joining frames from the first video stream and the second video stream at the identified plurality of spatiotemporal seams. For instance, the video compositing component 110 could determine the spatiotemporal seams by constructing a graph where each node represents a pixel from a frame of the video streams. The video compositing component 110 could then downsample the graph and could iteratively perform a graph cut analysis on the downsampled graph, upsampling the graph after the completion of each analysis, until the graph cut analysis is performed at the full resolution of the frame. By doing so, the video compositing component 110 may determine optimal spatiotemporal seams at which to composite the video streams together.

In the preceding, reference is made to various embodiments. However, it should be understood that the present disclosure is not limited to specific described embodiments. Instead, embodiments may implement and/or practice any combination of the aforementioned features and elements, whether related to different embodiments or not. Furthermore, although particular embodiments may achieve advantages over other possible solutions and/or over the prior art, whether or not a particular advantage is achieved by a given embodiment is not limiting. Thus, the preceding aspects, features, embodiments and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as, e.g., a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium is thus any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Additionally, embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present application, a video compositing component 110 could execute on a computing system in the cloud and could receive two or more video streams to be composited together into a single composite video stream. In such a case, the video compositing component could determine a plurality of spatiotemporal seams based on the video streams, and could composite the video streams by joining the video streams together at the plurality of spatiotemporal seams. Doing so allows a user to submit video streams for processing from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of creating a composite video stream, comprising:
   receiving a first selection of pixels from a first video stream and a second selection of pixels from a second video stream, where both the first selection of pixels and the second selection of pixels indicate pixels to be included in the composite video stream;

identifying a plurality of spatiotemporal seams across the first video stream and the second video stream having a minimal visibility impact with respect to both space and time, based at least in part on the first selection of pixels and the second selection of pixels; and compositing the first video stream and the second video stream to create the composite video stream, by joining frames from the first video stream and the second video stream at the identified plurality of spatiotemporal seams.

2. The method of claim 1, further comprising:

adjusting both the first video stream and the second video stream to compensate for camera motion, wherein the plurality of spatiotemporal seams are identified across the adjusted first video stream and the adjusted second video stream.

3. The method of claim 1, further comprising:

calculating a measure of blurriness for each of the first video stream and the second video stream;

determining which of the first video stream and the second video stream is a more blurry video stream and which is a less blurry video stream, based on the calculated measures of blurriness; and blurring the less blurry video stream, based on the calculated measure of blurriness for the more blurry video stream.

4. The method of claim 3, wherein the measures of blurriness are calculated by determining a sum of absolute values of gradients averaged over color channels.

5. The method of claim 1, further comprising:

blending pixels within the composite video stream, based on the plurality of spatiotemporal seams at which the first video stream and the second video stream were joined.

6. The method of claim 5, wherein the blending is performed using at least one of simple alpha-blending techniques, alpha-blending combined with histogram matching techniques, and Poisson blending techniques using convolution pyramids.

7. The method of claim 1, further comprising:

cropping the composite video stream, such that no missing pixels remain within the cropped composite video stream.

8. The method of claim 7, wherein cropping the composite video stream further comprises, for each of a plurality of frames of the composite video stream:

counting a number of empty pixels closest to each border of the frame;

determining which of the borders of the frame has the highest number of empty pixels;

cropping one pixel from the determined border; and repeating the counting, determining and cropping until no empty pixels remain within the frame.

9. The method of claim 1, further comprising:

aligning pixels within the second video stream relative to pixels within the first video stream.

10. The method of claim 9, wherein aligning pixels within the second video stream relative to pixels within the first video stream further comprises:

performing a hierarchical compass search analysis to align a reference frame of the second video stream relative to a corresponding reference frame of the first video stream;

calculating a first homography from a plurality of estimated displacement vectors;

calculating temporal frame-to-frame homographies for both the first video stream and the second video stream independently using the hierarchical compass search analysis; and for each of a plurality of subsequent frames of the second video stream:

calculating a predicted homography from available spatial reference and temporal estimates;

warping an actual image B(t+1) using a predicted homography H*(t+1), such that a resulting image (B*(t+1)) is closer to another actual image A(t−1);

calculating a correction homography ΔH(t+1) using the hierarchical compass search analysis between B*(t+1) and A(t+1); and calculating a final spatial homography using concatenation according to H(t+1)=ΔH(t+1)*H*(t+1).

11. The method of claim 1, further comprising:

color balancing the aligned second video stream, relative to a coloration of the first video stream.

12. The method of claim 1, wherein identifying a plurality of spatiotemporal seams across the first video stream and the second video stream further comprises:

converting the first video stream to a first lower resolution video stream;

converting the second video stream to a second lower resolution video stream; and determining a position of the plurality of spatiotemporal seams within the first lower resolution video stream and the second lower resolution video stream.

13. The method of claim 12, wherein identifying a plurality of spatiotemporal seams across the first video stream and the second video stream further comprises:

determining a position of the plurality of spatiotemporal seams within a first higher resolution video stream and a second higher resolution video stream, wherein the first higher resolution video stream has a greater resolution than the first lower resolution video stream, and wherein the first higher resolution video stream has a smaller resolution than the first video stream, wherein the second higher resolution video stream has a greater resolution than the second lower resolution video stream, and wherein the second higher resolution video stream has a smaller resolution than the second video stream, and wherein the position of the plurality of spatiotemporal seams within a first higher resolution video stream and a second higher resolution video stream are within a predefined threshold distance from the position of the spatiotemporal seams within the first lower resolution video stream and a second lower resolution video stream.

14. The method of claim 13, further comprising:

iteratively computing higher resolution video streams and determining a position of the plurality of spatiotemporal seams within the higher resolution video streams, until the computed video streams have the same resolution as the first video stream and the second video stream.

15. The method of claim 1, wherein identifying the plurality of spatiotemporal seams across the first video stream and the second video stream having the minimal visibility impact with respect to both space and time further comprises:

constructing a graph comprising a plurality of nodes, where each node of the plurality of nodes corresponds to a pixel within a first frame of the first video stream or a second frame of the second video stream, wherein each pixel of the first frame and the second frame is represented in the graph;

performing motion compensation by determining temporal neighbors in the constructed graph, comprising:
  using an estimated homography mapping from frame t to frame t+1; and
  choosing a closest matching pixel to create a graph edge;
calculating a weight for each edge of the graph by calculating an average difference of pixels represented by connected nodes;
adjusting weights of nodes corresponding to either the first selection of pixels or the second selection of pixels; and
performing a standard min-cut algorithm to compute an optimal seam by determining, for each pixel in the composite video stream, whether the pixel corresponds to either the first video stream or the second video stream.

16. A computer program product, comprising:
a non-transitory computer-readable medium containing computer program code that, when executed, is configured to:
  receive a first selection of pixels from a first video stream and a second selection of pixels from a second video stream, where both the first selection of pixels and the second selection of pixels indicate pixels to be included in the composite video stream;
  identify a plurality of spatiotemporal seams across the first video stream and the second video stream having a minimal visibility impact with respect to both space and time, based at least in part on the first selection of pixels and the second selection of pixels; and
  composite the first video stream and the second video stream to create the composite video stream, by joining frames from the first video stream and the second video stream at the identified plurality of spatiotemporal seams.

17. A system, comprising:
a processor; and
a memory containing a program that, when executed by the processor, performs an operation comprising:
  receiving a first selection of pixels from a first video stream and a second selection of pixels from a second video stream, where both the first selection of pixels and the second selection of pixels indicate pixels to be included in the composite video stream;
  identifying a plurality of spatiotemporal seams across the first video stream and the second video stream having a minimal visibility impact with respect to both space and time, based at least in part on the first selection of pixels and the second selection of pixels; and
  compositing the first video stream and the second video stream to create the composite video stream, by joining frames from the first video stream and the second video stream at the identified plurality of spatiotemporal seams.

18. The system of claim 17, the operation further comprising:
  aligning pixels within the second video stream relative to pixels within the first video stream, comprising:
    performing a hierarchical compass search analysis to align a reference frame of the second video stream relative to a corresponding reference frame of the first video stream;
    calculating a first homography from a plurality of estimated displacement vectors;
    calculating temporal frame-to-frame homographies for both the first video stream and the second video stream independently using the hierarchical compass search analysis; and
    for each of a plurality of subsequent frames of the second video stream:
      calculating a predicted homography from available spatial reference and temporal estimates;
      warping an actual image B(t+1) using a predicted homography H*(t+1), such that a resulting image (B*(t+1)) is closer to another actual image A(t+1);
      calculating a correction homography $\Delta H(t+1)$ using the hierarchical compass search analysis between B*(t+1) and A(t+1); and
      calculating a final spatial homography using concatenation according to $H(t+1)=\Delta H(t+1)*H*(t+1)$.

19. The system of claim 17, wherein identifying the plurality of spatiotemporal seams across the first video stream and the second video stream having the minimal visibility impact with respect to both space and time further comprises:
  constructing a graph comprising a plurality of nodes, where each node of the plurality of nodes corresponds to a pixel within a first frame of the first video stream or a second frame of the second video stream, wherein each pixel of the first frame and the second frame is represented in the graph;
  performing motion compensation by determining temporal neighbors in the constructed graph, comprising:
    using an estimated homography mapping from frame t to frame t+1; and
    choosing a closest matching pixel to create a graph edge;
  calculating a weight for each edge of the graph by calculating an average difference of pixels represented by connected nodes;
  adjusting weights of nodes corresponding to either the first selection of pixels or the second selection of pixels; and
  performing a standard min-cut algorithm to compute an optimal seam by determining, for each pixel in the composite video stream, whether the pixel corresponds to either the first video stream or the second video stream.

20. The system of claim 17, the operation further comprising:
  calculating a measure of blurriness for each of the first video stream and the second video stream;
  determining which of the first video stream and the second video stream is a more blurry video stream and which is a less blurry video stream, based on the calculated measures of blurriness; and
  blurring the less blurry video stream, based on the calculated measure of blurriness for the more blurry video stream.

* * * * *